Nov. 6, 1923.

A. L. MORON

MILK DISPENSER

Filed Dec. 8, 1922

Inventor:
Alfred L. Moron,
by Walter E. Lombard
Atty.

Nov. 6, 1923.

A. L. MORON 1,473,499

MILK DISPENSER

Filed Dec. 8, 1922

Inventor:
Alfred L. Moron,
by Walter E. Lombard,
Atty.

Patented Nov. 6, 1923.

1,473,499

UNITED STATES PATENT OFFICE.

ALFRED L. MORON, OF EAST BOSTON, MASSACHUSETTS.

MILK DISPENSER.

Application filed December 8, 1922. Serial No. 605,627.

*To all whom it may concern:*

Be it known that I, ALFRED L. MORON, a citizen of the United States of America, and a resident of East Boston, in the county of Suffolk and State of Massachusetts, have invented certain new and useful Improvements in Milk Dispensers, of which the following is a specification.

This invention relates to devices for dispensing liquids in restaurants, the object of the invention being to provide a device in which the liquid will be thoroughly mixed each time any liquid is removed from the container, in order that all customers may be treated alike.

The device is adapted primarily for dispensing milk and consists of a milk container provided with a central chamber having a perforated wall through the perforations of which the central inner chamber communicates with the main outer chamber of said container, the lower end of said perforated wall being removed from the bottom of said container.

The invention further consists of a dispensing ladle having an outwardly extending flange provided with perforations and preferably having a valve in the bottom thereof.

The invention further consists in certain novel features of construction and arrangement of parts which will be understood readily by reference to the description of the drawings and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings.

Similar characters indicate like parts throughout the several figures of the drawings.

Figure 1:
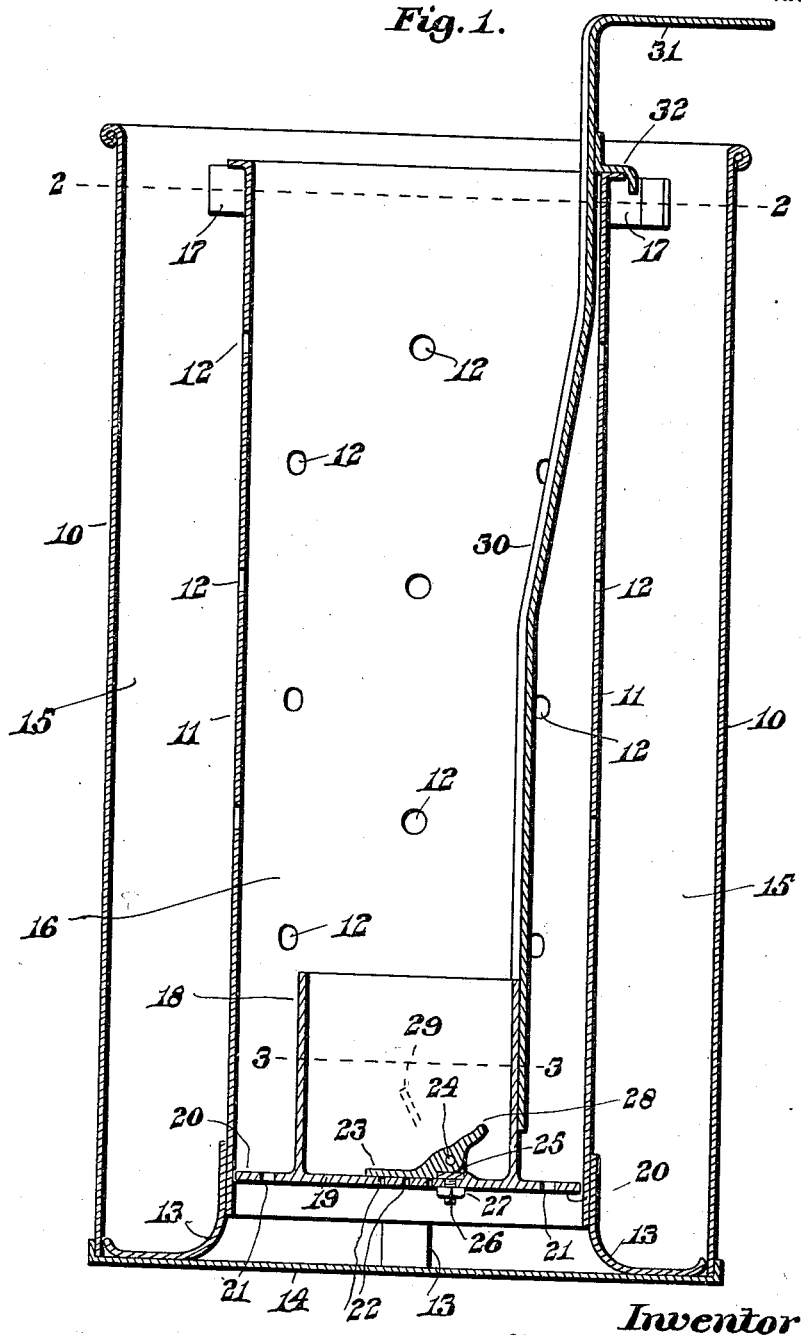
Figure 1 represents a vertical section of a device embodying the principles of the invention.
Figure 2:
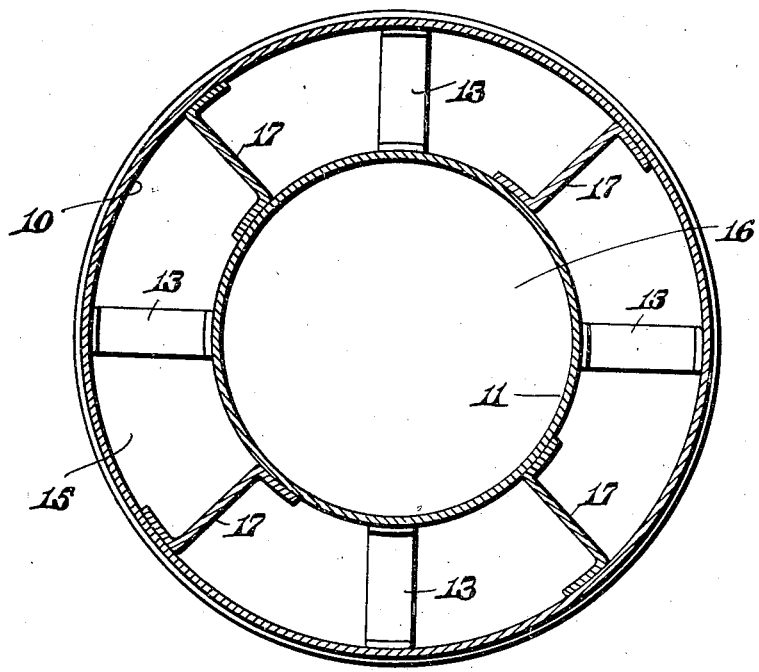
Figure 2 represents a horizontal section through the milk container on line 2, 2 on Fig. 1.
Figure 3:
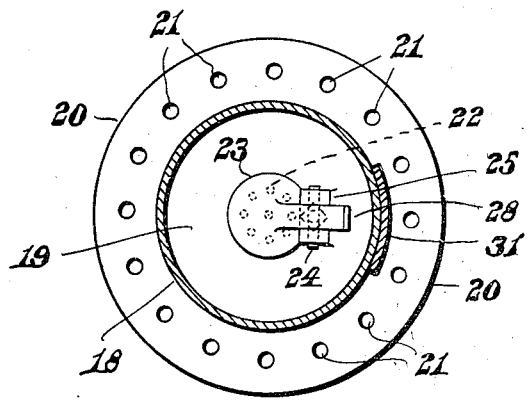
Figure 3 represents a horizontal section through the ladle on line 3, 3 on Fig. 1.

In the drawings, 10 is a liquid container preferably cylindrical and disposed within this container is a cylinder 11 having a plurality of perforations 12 in the wall thereof.

The lower end of the cylinder 11 has downwardly extending legs 13 resting upon the bottom 14 of the container 10. These legs 13 retain the lower end of the cylinder 11 in a raised position above the bottom 14 so that at this point the outer chamber 15 of the container 10 communicates with the inner central chamber 16 within the cylinder 11.

The upper end of the cylinder 11 is centrally positioned within the container 10 by means of the radial arms 17. Within the cylinder 11 is normally positioned a ladle 18, the diameter of which is considerably less than the diameter of the inner diameter of the cylinder 11, and the bottom 19 of said ladle extends outwardly, forming a flange 20 substantially fitting the interior of the cylinder 11.

This flange 20 is provided with a plurality of perforations 21 therethrough.

The bottom 19 also has a plurality of openings 22 therethrough communicating with the interior of the ladle 18. These openings 22 are normally closed by means of a valve 23 pivoted at 24 to a hinge member 25 provided with a threaded shank 26 extending through the bottom 19, said hinge member being secured in position by means of a nut 27 on said shank 26. By removing the nut 27, the hinge member 25 with the valve 23 thereon may be removed when it is desired to cleanse the valve mechanism.

The valve member 23 is provided with a finger 28 which limits the opening of the valve 23 by coming into contact with the bottom 19. The amount of opening of the valve is preferably as indicated in dotted lines at 29. When the ladle 18 is raised, the valve 23 will be closed by the liquid within the cylinder 11 forcing it about its pivot 24.

Extending upwardly from the ladle 18 is a handle 30 provided at its upper end with an outward extension 31 to be grasped by the operator.

Secured to the handle 31 is a projecting member 32 adapted normally to rest upon the upper end of the cylinder 11 and thereby prevent the flange 21 being lowered below the lower end of the cylinder 11.

In the operation of the device, when the ladle is raised in the cylinder 11 to dispense a given quantity of liquid, the valve 23 will be closed, preventing any liquid within the ladle from passing through the openings 22.

When the ladle is raised, a portion of the liquid within the cylinder 11 will pass downwardly through the perforations 21 in the flange 20.

It is obvious that all of the liquid in the cylinder 11 cannot pass readily through the perforations 21 and therefore portions of the liquid will be raised during the upward movement of the ladle until they reach the perforations 12, thereby causing the liquid to pass outwardly through the perforations into the outer chamber 15.

When the ladle is again lowered into the cylinder 11, the valve 23 will be moved into the position indicated in dotted lines at 29, and a portion of the liquid below the ladle will pass through the openings 22 into the ladle.

During the same downward movement of the ladle, the portions of the liquid below the bottom of the ladle will be forced through the perforations 21 upwardly into the cylinder 11, while other portions will be forced outwardly beneath the bottom of the cylinder 11 into the outer chamber 15, from which they will return into the inner chamber 16 of the cylinder 11 through the perforations 12.

It is obvious, therefore, that every time liquid is dispensed from the container by means of the ladle 18, a thorough mixture of the liquid within the container will be made. This mixing of the liquid will cause all of the liquid within the container to be of the same character, and in the case of milk, will prevent the cream from rising to the top, for it is self-evident that by means of this device the cream will be thoroughly mixed with the milk so that each customer will receive the same quality. Heretofore, in the dispensing of liquids, such as milk, the first customers were liable to secure all the cream contained within the milk and the later customers would secure an inferior quality. This device overcomes this objection.

It is believed that the operation and many advantages of the invention will be understood readily without further description.

Having thus described my invention, I claim:

1. The combination of a liquid container having communicating chambers, and a ladle provided with a perforated flange substantially fitting one of said chambers.

2. The combination of a liquid container having communicating chambers, and a ladle provided with a perforated flange substantially fitting one of said chambers and having a valve in the bottom thereof adapted to be opened when the ladle is lowered in said chamber.

3. The combination of a liquid container; a perforated cylinder positioned therein; and a ladle having a perforated flange extending outwardly therefrom nearly to the wall of said cylinder.

4. The combination of a liquid container; a perforated cylinder positioned therein with its lower end removed from the bottom of said container; and a ladle having a perforated flange extending outwardly therefrom nearly to the wall of said cylinder.

5. The combination of a liquid container; a removable perforated cylinder positioned therein; a ladle having a perforated flange substantially fitting said cylinder and provided with openings in the bottom thereof; and a valve for closing said openings when the ladle is raised.

6. The combination of a liquid container; a removable perforated cylinder positioned therein; a ladle having a perforated flange substantially fitting said cylinder and provided with openings in the bottom thereof; a valve for closing said openings when the ladle is raised; and means for limiting the opening of said valve.

7. The combination of a liquid container; a removable perforated cylinder positioned therein; having supporting legs extending downwardly beyond the lower end thereof; a ladle having a perforated flange substantially fitting said cylinder and provided with openings in the bottom thereof; and a valve for closing said openings when the ladle is raised.

8. The combination of a liquid container; a removable perforated cylinder therein; a ladle having a perforated flange substantially fitting said cylinder; and means for centrally positioning said cylinder in said container.

9. The combination of a liquid container; a perforated cylinder therein; a ladle having a perforated flange substantially fitting said cylinder and provided with openings in the bottom thereof; and a removable valve secured to said ladle and adapted to close said openings when the ladle is raised.

10. The combination of a liquid container;

a perforated cylinder therein; a ladle in said cylinder having a perforated bottom flange extending nearly to the inner wall of said cylinder, a handle on said ladle; and a projection on said handle adapted to normally rest on the upper end of said cylinder.

Signed by me at 746 Old South Bldg., Boston, Mass., this 4th day of December, 1922.

ALFRED L. MORON.

Witnesses:
 WALTER E. LOMBARD,
 NATHAN C. LOMBARD.